Dec. 29, 1959 B. EPSZTEIN 2,919,375

BACKWARD WAVE TRAVELING WAVE TUBES

Filed May 9, 1956 3 Sheets-Sheet 1

Dec. 29, 1959 B. EPSZTEIN 2,919,375

BACKWARD WAVE TRAVELING WAVE TUBES

Filed May 9, 1956 3 Sheets-Sheet 2

United States Patent Office 2,919,375
Patented Dec. 29, 1959

2,919,375

BACKWARD WAVE TRAVELING WAVE TUBES

Bernard Epsztein, Paris, France, assignor to Compagnie Generale de Telegraphie Sans Fil, a corporation of France Application May 9, 1956, Serial No. 583,763

Claims priority, application France June 10, 1955

6 Claims. (Cl. 315—3.5)

The present invention relates to backward wave traveling wave tubes, and more particularly to delay lines for tubes of this type.

Interdigital delay lines for traveling wave tubes are well known. Such lines comprise essentially a pair of combs. Each comb comprises a base formed with a plurality of fingers perpendicular thereto and their respective fingers are interdigitated. When the length of the fingers of the line is smaller than a quarter-wave length in free space of operating wave, the line presents delayed propagation characteristics in a direction parallel to the bases, such that the fundamental space component, resulting from decomposing the operating wave into space harmonic components, is a backward or reverse wave, i.e. its phase and group velocities have opposite directions.

The present invention provides a new type of interdigital delay line wherein the fingers are oblique with respect to their respective bases, instead of being perpendicular thereto as in known interdigital delay lines.

The invention also provides a backward traveling wave tube comprisng the above delay line. This tube according to the invention may be an amplifier or an oscillator.

In traveling wave tubes with a conventional interdigital line, the electron beam is propagated parallel to the bases of the line. In tubes with the interdigital delay line according to the invention, the beam is propagated in a direction perpendicular to the bases of the line. This arrangement may, in certain cases, offer appreciable advantages which will be more particularly set forth later in the present description.

Figure 1:
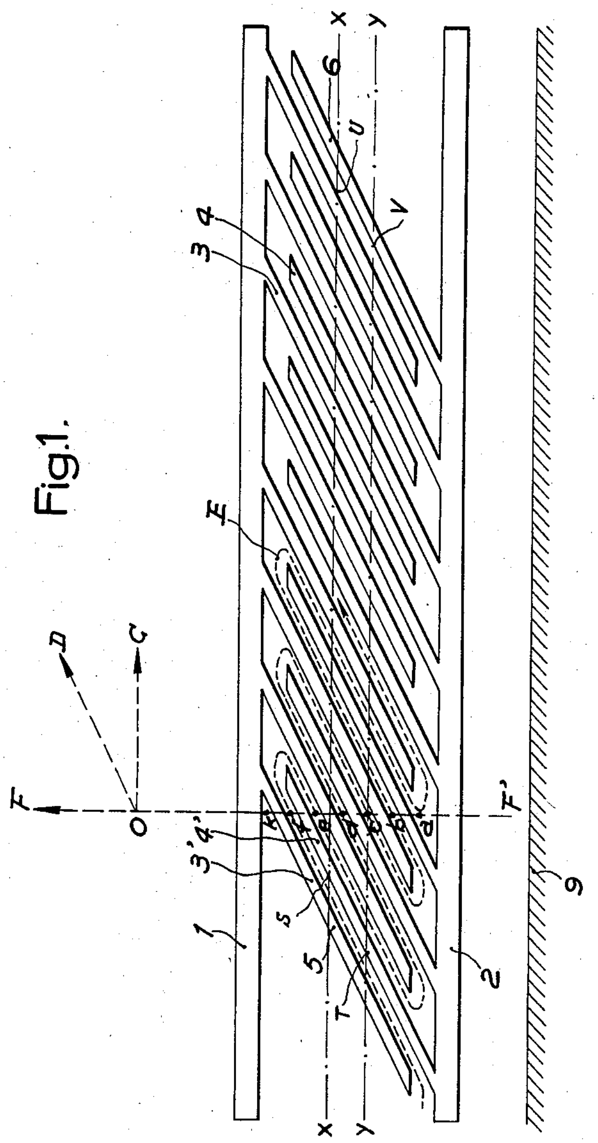
Figure 2:
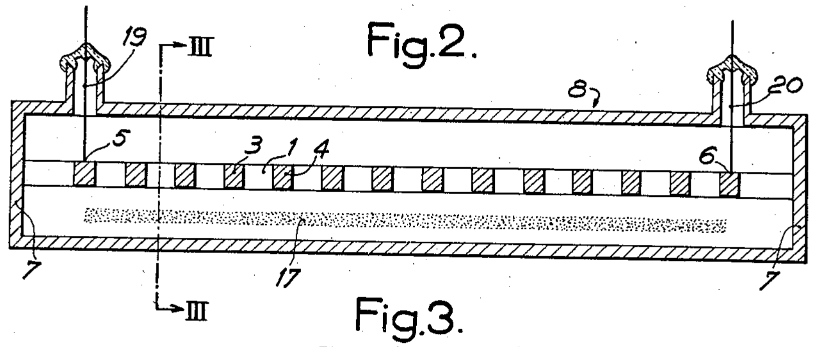
Figure 3:
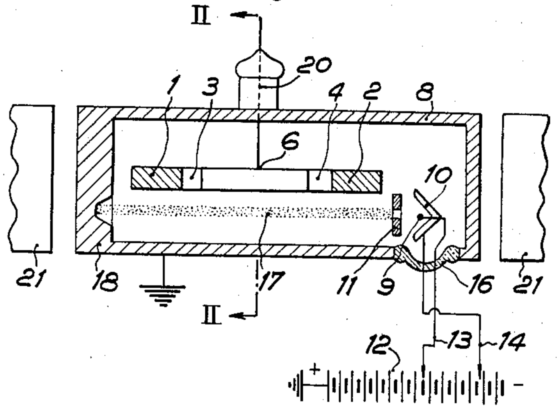
Figure 5:
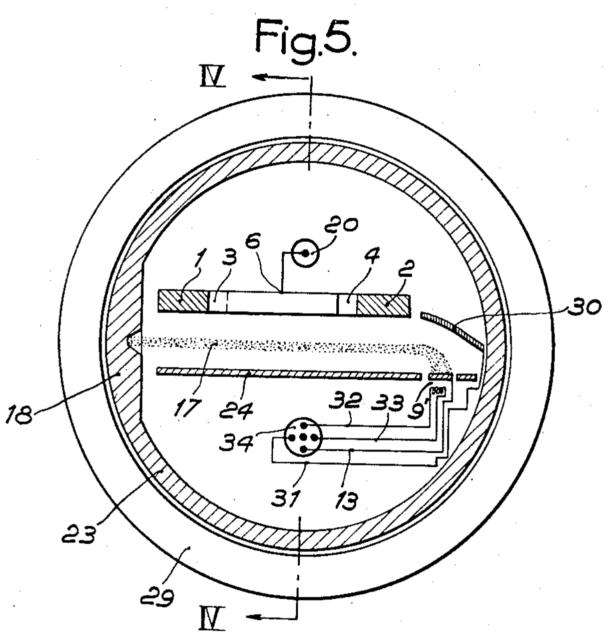
Figure 4:
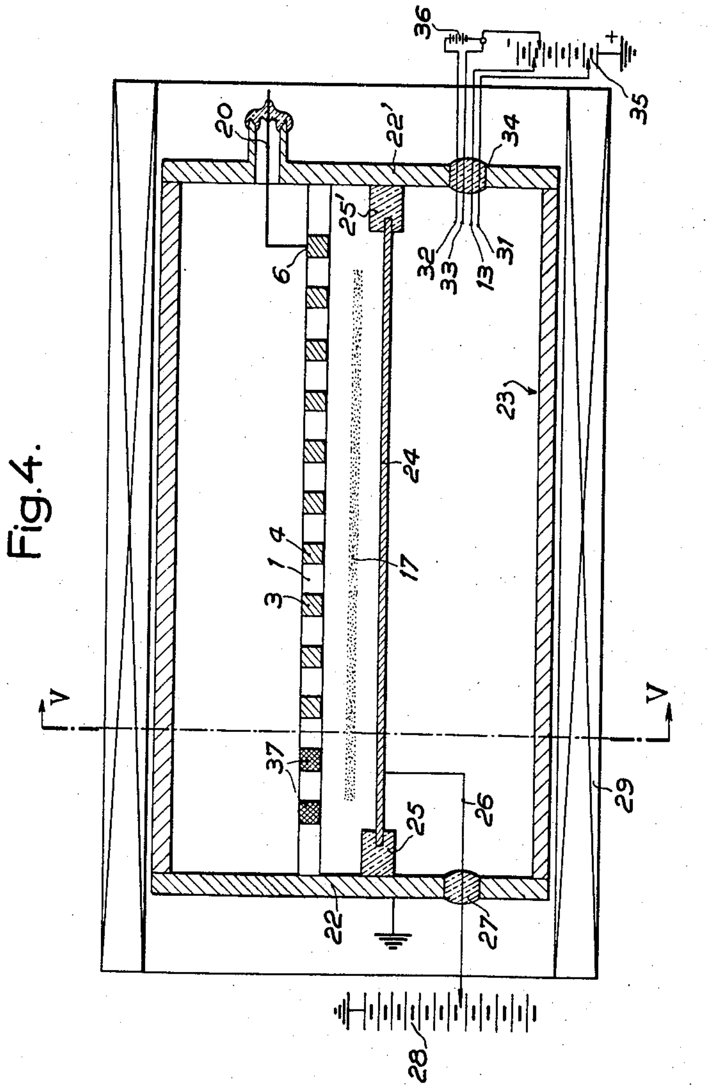

The invention will be described in greater detail in connection with the accompanying drawing, wherein:

Fig. 1 is a plan view of the interdigital delay line according to the invention;

Figs. 2 and 3 respectively show a longitudinal section along the line II—II of Fig. 3 and a transverse cross-section along the line III—III of Fig. 2 of a backward wave amplifier with a delay line according to Fig. 1;

Figs. 4 and 5 respectively show a longitudinal section along the line IV—IV of Fig. 5 and a transverse cross-section along the line V—V of Fig. 4 of a backward wave oscillator with a delay line according to Fig. 1.

Same references have been used throughout all the description to designate same elements.

The line shown in Fig. 1 comprises, like any conventional interdigital delay line, two similar combs, each having bases 1 and 2, carrying the fingers 3 and 4 respectively, the fingers of one comb being interdigitated with the fingers of the other. However, in contradistinction to the known interdigital lines, the fingers are oblique with respect to their respective bases.

The interaction of a field, propagating in the delay line of Fig. 1, with an electron beam supplied by a cathode 9, parallel to bases 1 and 2, and thus propagating perpendicularly thereto, will now be described.

The wave field propagates in the duct bounded by fingers 3 and 4, as shown by the dotted line E. An electron stream F, projected from cathode 9, intercepts this field at a plurality of points *a, b, c, d, e, f*. . . . At these points, the stream F is coupled with high frequency field components having, alternately, opposite directions. Thus, the electrons of the stream are alternately accelerated and delayed i.e. the electron stream is velocity modulated.

It is well known that, when the propagation velocity of an electron beam is in synchronism with the phase velocity of a space component, the fundamental component for example, of an ultra high frequency wave propagating in a delay line parallel to an electron beam, the wave and the beam interact. When this interaction occurs in the reverse, or backward, mode the directions of propagation of the electron beam and of the energy are opposite, i.e. in the present case energy propagates in the FF′ direction.

Theory and practice show that for this to occur, the direction of the wave guiding ducts, i.e. the direction of the fingers of Fig. 1, must be included in a right angle FOC formed by the propagation direction of the electrons and the direction of propagation of the energy as a whole, in the delay line considered.

While it is not the applicant's intention to attempt a full fledged theoretical demonstration of this rule, the following explanation seems to be fairly satisfactory: if points *e* and *d*, for instance, are considered, it is readily seen that for the energy to propagate from *e* to *d*, and not from *d* to *e*, the projection of the direction of energy propagation on the electron stream path F′F should be in the direction FF′. This happens if energy in the delay line propagates as indicated in Fig. 1.

In the case of the backward wave oscillator, described in the copending application, Serial No. 281,347, filed by Bernard Epsztein, April 9, 1952, now Patent No. 2,880,355, and assigned to the same assignee, the energy will be collected at the end 6, there being of course no input. Absorbing means is provided on, or in the field of, fingers 3′ and 4′.

By way of examples of tubes equipped with a delay line according to the invention, there will now be described an amplifier of the so called O type, i.e. a traveling wave amplifier having no crossed magnetic and electric fields perpendicular to the beam, and an oscillator of the so called M type, i.e. having an electrode parallel to the delay line and crossed electric and magnetic fields normal to the electron beam.

Figs. 2 and 3 shows a backward wave amplifier, comprising a delay line according to the invention. Bases 1 and 2 of the delay line are secured on end walls 7 of a parallelepipedic metal box 8, forming the tight, evacuated envelope of the tube. Walls 7 also support an electron gun, extending parallel to the bases 1 and 2, and including a cathode 9, a Wehnelt electrode 10 and an accelerating anode 11. Electrodes 9 and 10 are conveniently insulated from the walls of the tube, whereas electrode 11 may be supported by the walls without interposition of any insulating means, so that its potential is the same as that of the line and the surrounding space is equipotential. Electrodes 9 and 10 are brought to convenient potentials by means of a source 12 and the respective connections 13, 14, passing through a glass seal 16, the cathode 9 being brought to a negative potential with respect to envelope 8, which is assumed to be grounded. The electron gun is adapted to emit a laminary electron beam 17, propagating in a plane parallel to the delay line in coupled relationship therewith, and in a direction perpendicular to bases 1 and 2. At the end of its path, the beam is collected by a collector 18, incorporated in one of the side-walls of the envelope 8. The accelerating anode 11 is brought to such a potential with respect to the cathode 9, that the velocity of the electrons is made substantially equal to the velocity of the component, having the same direction as the beam, of the fundamental space harmonic of the energy fed to the input 19 of the tube at the desired frequency.

For focusing the beam, use may be made of a longitudinal magnetic field, i.e., a field having its line of force parallel to the direction of the electron beam. Fig. 3 shows the pole pieces 21 for providing this field. Absorbing means may be provided by coating with an absorbing substance an intermediate portion of the line, in the direction of beam propagation, for instance the portion comprised between planes XX and YY in Fig. 1 and, more exactly, the part of said portion restricted to the parallelogram STUV, thus excluding at least the first finger 5 and the last finger 6 of the delay line, to which the energy input 19 and the amplified energy output 20 are respectively coupled.

In the embodiment of Figs. 4 and 5 the delay line is supported by lids 22 and 22′ of a vacuum tight cylindrical evacuated envelope 23. An electrode 24, usually called a sole, is carried by two insulators 25 and 25′, secured to lids 22 and 22′ and extends parallel to the delay line. Sole 24 is, in accordance with conventional practice, brought to a negative potential with respect to the delay line to establish an electric field therebetween, by means of a connection fed by a supply source 28 and extending through a glass seal 27. An axial magnetic field is supplied by a coil 29. An emissive cathode 9′ is located in a slit provided in electrode 24, and extends in a direction parallel to the axis of the coil 29. Cathode 9′ is insulated from the envelope 23 and is brought to a negative potential through connection 13. A positive electrode 30, forming an electron optical system and insulated from the cathode is located opposite the latter and is brought to a positive potential through connection 31. The heating connections 32, 33 for filament of cathode 9′ are also shown in the figure. Connections 13, 31, 32, 33 pass through an insulating seal 34 and are fed by sources 35, 36 which may be combined with source 28.

As is well known, cathode 9′ emits a beam 17 which is bent under the action of the electron optical system formed by electrode 30 and the crossed electric and magnetic fields, and propagates in the interaction space between the delay line and the sole, at a velocity equal to the ratio between the intensities of electric and magnetic fields. At the end of the path, the beam is collected by collector 18, incorporated in the cylindrical wall 23.

The component in the direction of the electron beam, of the fundamental space harmonic of the wave induced in the delay line interacts with the electron beam, and the energy is extracted at 20, the opposed end of the delay line being provided with absorbing means 37, all that being in accordance with the teaching of the above mentioned patent application.

The backward wave tube of the invention has the advantage of using for the interaction between the wave energy and the beam the fundamental spatial component, which not only is the most rapid, but also, owing to the line structure according to the invention, is the most intense of the various space harmonics. For this reason, it is this component which carries along the most of the energy distributed among all space components. Its use for interaction is therefore particularly interesting for making a highly efficient tube, as compared with tubes employing other space components than the fundamental.

Further, the invention makes it possible to provide tubes of comparatively small dimensions, since the electron beam is much stronger than with conventional delay lines. Moreover, the fingers of the delay line according to the invention being inclined with respect to the bases, their length may be increased, without increasing the general dimensions of the line. This is a particularly interesting feature in the case of comparatively long waves, for instance of the order of 50 cm. or 1 m.

It is obvious that the invention is not limited to the embodiments represents and described, which have been selected by way of examples only. Thus, the amplifier may be as well of the M-type as of the O-type, and the oscillator may be of the O-type as well as of the M-type.

What I claim is:

1. A backward wave traveling wave tube comprising: a delay line having two similar combs, each comb having a base and a plurality of parallel fingers of constant width in the plane of said combs, said fingers being supported by, and disposed obliquely with respect to, said base, said combs having their respective bases parallel to each other and their respective fingers mutually interdigitated, said delay line having two ends; a cathode having an emissive surface parallel to said bases and positioned adjacent to one of said bases for projecting an electron beam in a direction transverse with respect to said delay line and in coupled relationship therewith; and an output connection for extracting energy from said delay line at the end thereof corresponding to the direction in which said fingers, supported by the base adjacent to which said cathode is located, are inclined.

2. A backward wave traveling wave tube comprising: a delay line having two similar combs, each comb having a base and a plurality of parallel fingers of constant width in the plane of said combs, said fingers being supported by, and disposed obliquely with respect to, said base, said combs having their respective bases parallel to each other and their respective fingers mutually interdigitated, said delay line having two ends: a negative electrode parallel to said delay line and bounding therewith an interaction space; a cathode having an emissive surface parallel to said bases and positioned adjacent to one of said bases for projecting on electron beam, in a direction transverse with respect to said delay line and in coupled relationship therewith, into said interaction space; terminal connections for providing crossed electric and magnetic fields normal to said beam direction in said interaction space; and an output connection for extracting energy from said delay line at the end thereof corresponding to the direction in which said fingers, supported by the base adjacent to which said cathode is located, are inclined.

3. A backward wave traveling wave tube comprising: a delay line having two similar combs, each comb having a base and a plurality of parallel fingers of constant width in the place of said combs, said fingers being supported by, and disposed obliquely with respect to, said base, said combs having their respective bases parallel to each other and their respective fingers mutually interdigitated, said delay line having two ends; a cathode having an emissive surface parallel to said bases and positioned adjacent to one of said bases for projecting an electron beam in a direction transverse with respect to said delay line and in coupled relationship therewith; means for focusing said beam; and an output connection for extracting energy from said delay line at the end thereof corresponding to the direction in which said fingers supported by the base adjacent to which said cathode is located, are inclined.

4. A backward wave traveling wave amplifier tube comprising: a delay line having two similar combs, each comb having a base and a plurality of parallel fingers of constant width in the plane of said combs, said fingers being supported by, and disposed obliquely with respect to, said base, said combs having their pressure bases parallel to each other and their respective fingers mutually interdigitated, said delay line having two ends; a cathode having an emissive surface parallel to said bases and positioned adjacent to one of said bases for emitting an electron beam in a direction transverse with respect to said delay line and in coupled relationship therewith; an input connection for feeding energy into said delay line at the end thereof corresponding to the direction opposed to that in which said fingers, supported by the base adjacent to which said cathode is located, are inclined; and an output connection at the other end of said delay line.

5. A backward traveling wave tube as claimed in claim 4, further comprising attenuating means disposed on said delay line fingers intermediate said bases.

6. A backward wave traveling wave oscillator tube comprising: a delay line having two similar combs, each comb having a base and a plurality of parallel fingers of constant width in the plane of said combs, said fingers being supported by, and disposed obliquely with respect to, said base, said combs having their respective bases parallel to each other and their respective fingers mutually interdigitated, said delay line having two ends; a cathode having an emissive surface parallel to said bases and positioned adjacent to one of said bases for emitting an electron beam in a direction transverse with respect to said delay line and in coupled relationship therewith;

an output connection for extracting energy from said delay line at the end thereof corresponding to the direction in which said fingers, supported by the base adjacent to which said cathode is located, are inclined; and absorbing means at the other end of said delay line.

References Cited in the file of this patent

UNITED STATES PATENTS

| | | |
|---|---|---|
| 2,708,236 | Pierce | May 10, 1955 |
| 2,730,678 | Dohler et al. | Jan. 10, 1956 |
| 2,760,102 | Field | Aug. 21, 1956 |
| 2,770,780 | Warnecke et al. | Nov. 13, 1956 |
| 2,797,354 | De Vries et al. | June 25, 1957 |
| 2,879,437 | Leblond | Mar. 24, 1959 |

FOREIGN PATENTS

| | | |
|---|---|---|
| 699,893 | Great Britain | Nov. 18, 1953 |
| 1,081,937 | France | June 16, 1954 |